US006910319B2

(12) United States Patent
Castleberry

(10) Patent No.: US 6,910,319 B2
(45) Date of Patent: Jun. 28, 2005

(54) HYDROJET FOR CUTTING PLANT GROWTH FROM WATERWAYS

(76) Inventor: David Castleberry, 362 Morton St. West, Vale, OR (US) 97918

( * ) Notice: Subject to any disclaimer, the term of this patent is extended or adjusted under 35 U.S.C. 154(b) by 0 days.

(21) Appl. No.: 10/313,966

(22) Filed: Dec. 5, 2002

(65) Prior Publication Data

US 2003/0154702 A1 Aug. 21, 2003

Related U.S. Application Data

(60) Provisional application No. 60/337,929, filed on Dec. 5, 2001.

(51) Int. Cl.[7] ........ A01D 44/00
(52) U.S. Cl. ........ 56/8; 37/322
(58) Field of Search ........ 37/322, 323, 344, 37/335; 56/8, 9, 307, 344, 908

(56) References Cited

U.S. PATENT DOCUMENTS

| | | | | | |
|---|---|---|---|---|---|
| 3,295,231 | A | | 1/1967 | Talbott | 37/78 |
| 3,402,487 | A | | 9/1968 | Vaughan et al. | 37/78 |
| 3,599,354 | A | | 8/1971 | Larson | 37/78 |
| 3,624,933 | A | * | 12/1971 | Faldi | 37/320 |
| 3,751,887 | A | * | 8/1973 | Den et al. | 56/8 |
| 3,964,184 | A | | 6/1976 | Mathieu | 37/195 |
| 4,713,896 | A | | 12/1987 | Jennens | 37/54 |
| 4,819,347 | A | | 4/1989 | Lofgren | 37/78 |
| 4,854,058 | A | * | 8/1989 | Sloan et al. | 37/323 |
| 5,305,585 | A | | 4/1994 | Cousineau | 56/8 |
| 5,406,725 | A | | 4/1995 | Breese | 37/342 |
| 5,421,105 | A | * | 6/1995 | Schulte | 37/309 |
| 5,435,083 | A | * | 7/1995 | Thompson | 37/341 |

* cited by examiner

*Primary Examiner*—Meredith Petravick
(74) *Attorney, Agent, or Firm*—Pedersen & Co., PLLC; Ken J. Pedersen; Barbara S. Pedersen

(57) ABSTRACT

An apparatus and method for cutting plant growth from waterways to promote fluid passage through such waterway. Water under high pressure is forced through a nozzle orifice to cut, chop and/or pulverize the aquatic plant matter. The nozzle is on a spray-head assembly of the apparatus, which is positioned above or in the waterway by the boom of a vehicle such as, for example, a crane or backhoe. As the transport machinery and apparatus are advanced in the waterway, a path is cut through aquatic plant matter by the high pressure water from the nozzle, and, as a result, the waterway may be effectively cleared. In the preferred apparatus and method, wherein the nozzle directs the water vertically into the waterway, a steel plate may be submerged beneath the level of the nozzle and above the soil surface to protect the soil from disruption and erosion.

2 Claims, 4 Drawing Sheets

HYDROJET FOR CUTTING PLANT GROWTH FROM WATERWAYS

This application claims priority from U.S. Provisional Patent Application Ser. No. 60/337,929, filed on Dec. 5, 2001, entitled "Hydrojet for Cutting Plant Growth from Waterways", the disclosure of which is herein incorporated by reference.

BACKGROUND OF THE INVENTION

1. Field of the Invention

This invention relates generally to waterways such as, for example, irrigation ditches and canals, and the machines and techniques for maintaining them. More specifically, this invention relates to an apparatus and method for cutting plant growth from waterways using high pressure water.

2. Related Art

U.S. Pat. No. 3,295,231 (Talbott) discloses an apparatus which employs hydrojets to remove seaweed and other water vegetation from the soil of a waterway. With this device the entire plant, including the roots, is dislodged from the bottom of the waterway under the force of water jets emitted from submerged nozzles. Using this device, a substantial amount of bottom soil material is also dislodged.

U.S. Pat. No. 3,599,351 (Larson) also discloses an apparatus for removing weeds from soil under water through the use of hydrojet action. According to this invention, soil is removed from around the roots of weeds and underwater plants by a submerged jet assembly to uproot the plants.

U.S. Pat. No. 5,305,585 (Cousineau) discloses another aquatic plant removal device. According to this invention, the apparatus comprises a hollow handle and a hollow discharge head with a plurality of nozzles connected at right angles to the handle. This way, the handle, discharge head and nozzles function as a conduit for water passing from a hose to the proximal end of the handle. Again, the water emerging from the nozzles of this device disturbs the waterway soil surface to uproot aquatic plants.

Still, there is a need for an effective and convenient hydrojet apparatus for cutting plant growth from waterways without disturbing the soil or sediment at the bottom of the waterway. This way, aquatic plants may be removed without erosion of the bottom or sides of the waterway. This invention addresses that need.

SUMMARY OF THE INVENTION

The present invention is an apparatus and method for cutting plant growth from waterways to promote fluid passage through such waterway. According to a preferred embodiment of the process of the invention, water under high pressure is forced through a plurality of small orifices directed downward and situated above the surface of a waterway containing aquatic plants. The resulting hydrojets penetrate the body of water with considerable energy to cut, chop and/or pulverize the aquatic plant matter. In addition, a steel plate may be submerged beneath the surface of the water and the hydrojets, but above the soil surface. The plate is preferably maintained in the path of the hydrojet to protect the soil surface from disruption and erosion. This way, the waterway may be effectively cleared of aquatic plant matter, except for the stubble which passes beneath the plate as the apparatus is advanced in the waterway. Plant matter that is removed from the waterway may be collected and processed for use as, for example, animal feed.

In the preferred embodiment of the invention, the spray-head apparatus of the invention comprises a spray arm, or a plurality of such arms, moveably seated within a durable housing. The spray arm comprises one or several nozzles which may be directed towards the plant matter to be cut away. A steel plate may be attached to the head assembly such that the nozzles are directed onto the metal plate to prevent excessive disturbance of the waterway's soil/sedimentary surface. The housing of the spray-head apparatus is attached to, for example, the boom of a crane or backhoe wherein the spray-head assembly may be positioned above a waterway and advanced horizontally, for example, preferably up-stream. Water is supplied to the spray-head apparatus, particularly the nozzles, under high pressure. The water supply for the spray arm and nozzles may be drawn from the waterway being cleared. Preferably, water drawn from the waterway is pumped through a filter into a water reservoir or holding tank prior to being pressurized and provided to the spray nozzles. Water may be drawn from the source into a high pressure pump and supplied via a crane to the spray arm and nozzles. In the preferred case, as the apparatus is advanced, the nozzles are generally maintained at a height about 2–6 inches above the surface of the waterway with a height of 3½–4 inches above the surface being especially preferred.

DETAILED DESCRIPTION OF THE INVENTION

Referring to the Figures, there are depicted several, but not all, embodiments of the present invention.

Figure 1:
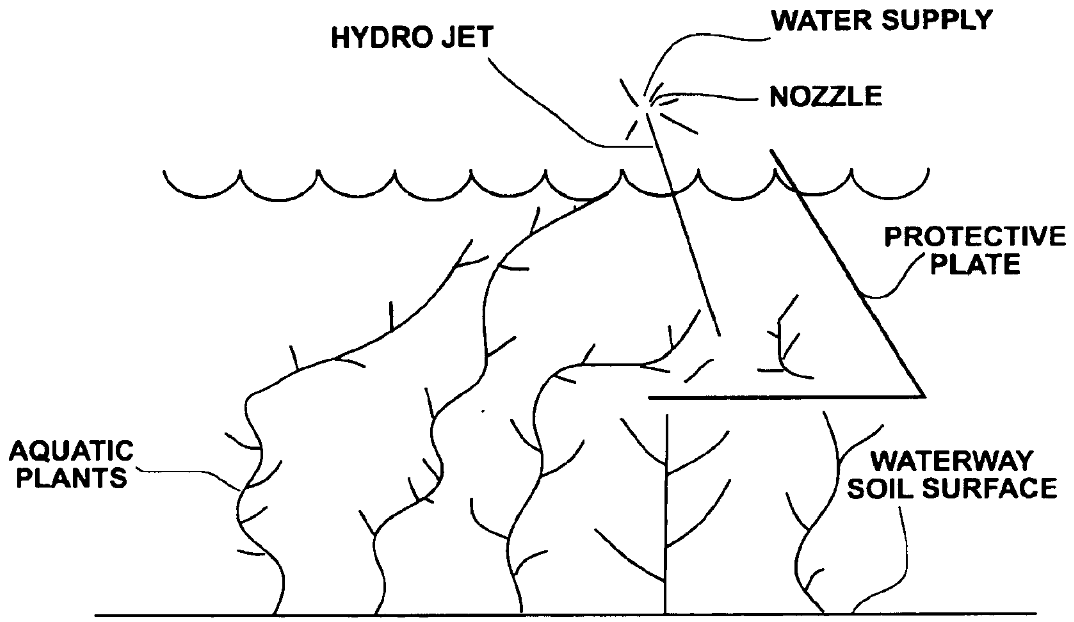
FIG. 1 is a side, schematic partial detail view of one embodiment of the process of the present invention in action.
Figure 2:
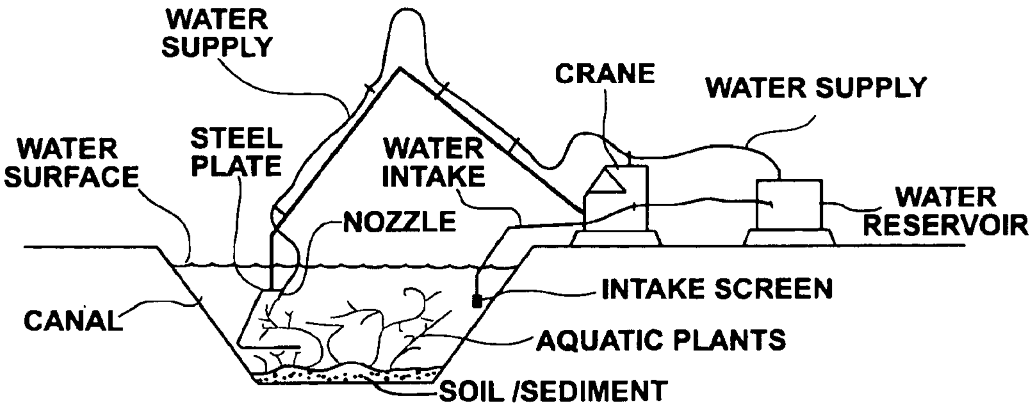
FIG. 2 is a side, schematic view of one embodiment of the apparatus of the present invention in use.

FIG. 1 depicts schematically the process of the present invention in use. The spray-head apparatus, preferably comprising several spray arms and a plurality of spray nozzles, is positioned above the waterway. The apparatus preferably attaches to the boom of, for example, a crane or backhoe which can be manipulated to extend from land alongside the waterway out above the waterway, as shown in FIG. 2. Alternatively, for ditches, canals and similar waterways, the apparatus may be hung from a cable or rod which extends between several mobile units positioned on opposing sides of the waterway and advanced simultaneously. Other options may be possible so long as the spray-head apparatus may be positioned over or in the waterway and advanced horizontally.

Figure 5:
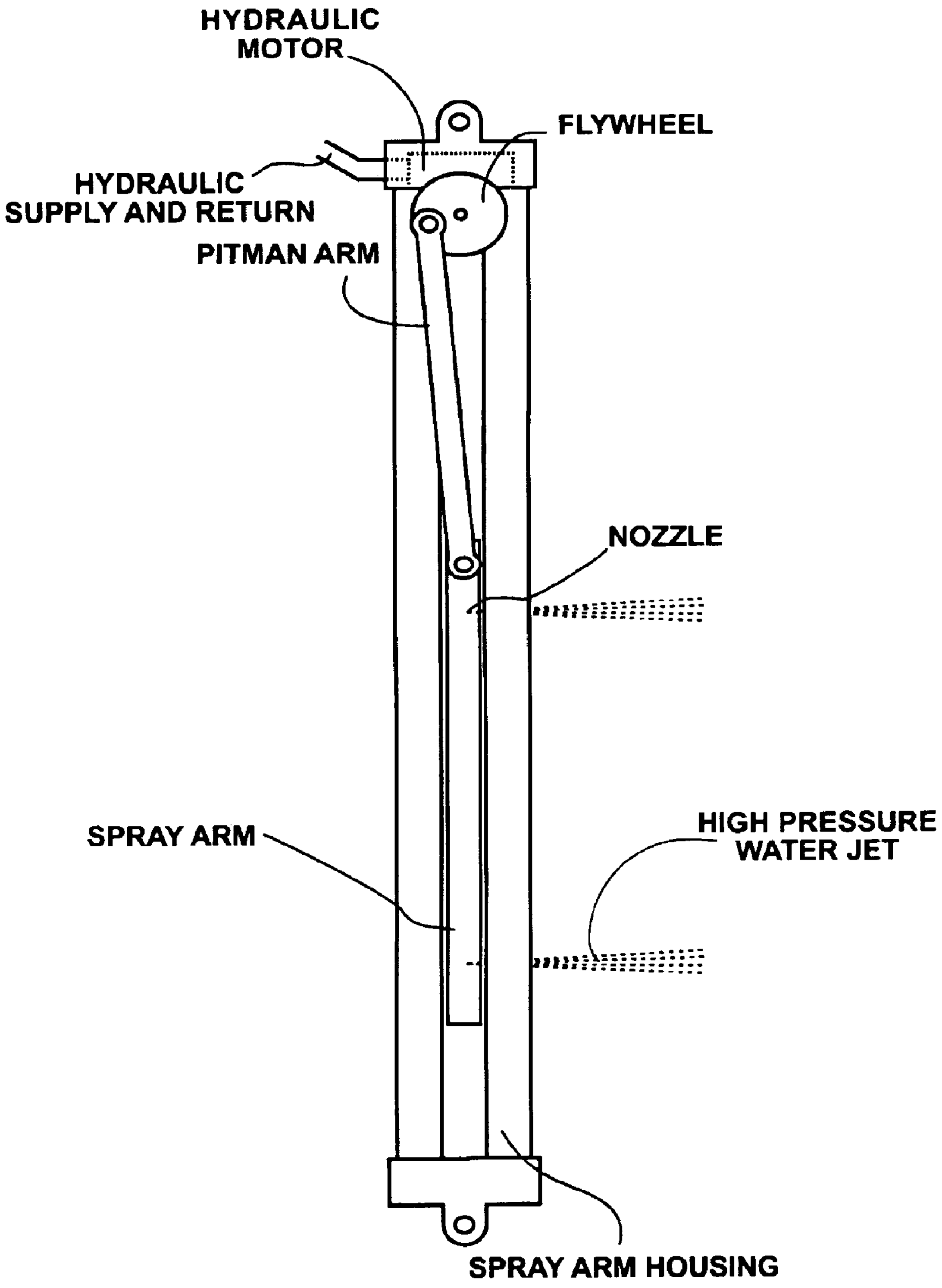
FIG. 5 is a top detail view of an alternative spray-head assembly of the present invention showing the nozzles directed horizontally.

The spray-head apparatus is preferably maintained at a height of about 2–6 inches above the surface of the waterway. In an especially preferred embodiment, this height is approximately 3½–4 inches. In an alternative embodiment, the spray-head apparatus may be fully submerged and the nozzles directed horizontally to cut plant matter from the waterway, as shown in FIG. 5. In this case, the head may be submerged to a height between 6 and 48 inches above the soil/sedimentary level of the waterway. Several spray-head assemblies may operate in tandem to clear a larger path. For example, several assemblies may be horizontally offset, and operated simultaneously, to offer wider coverage of the waterway.

As shown in the Figures, each nozzle on the spray arm emits a stream of high pressure water which cuts, chops and/or pulverizes plant matter in its path. The nozzles comprise small orifices on the order of 1–10/1000 (0.001–0.01) inches in diameter, through which water is forced under high pressure, generally between 2000–12000 pounds-per-square-inch (psi). For waterways such as, for example, irrigation canals, which may be several feet deep, the nozzle orifices are preferably between 3–6/1000 (0.003–006) inches in diameter and the water is supplied at approximately 3000–6000 psi. Materials for the nozzle, spray arm, housing and other components are specified according to conventions to minimize or eliminate corrosion, leaks and wear. For example, the nozzles are preferably constructed of stainless steel, steel alloys, ceramics or other hard materials that are resistant to degradation from wear.

Water may be supplied to the spray-head apparatus in a variety of ways. In the preferred embodiment, water is drawn from the waterway, then filtered and pressurized prior to being passed to the spray-head, particularly the spray arm and nozzles. In this situation, a water intake apparatus may be suspended from the boom of the transport system or otherwise positioned to draw fluid from the waterway. Using the waterway itself as a source of water ensures a convenient, renewable supply. Alternatively, water may be retained in a holding tank which travels in conjunction with crane, backhoe, or transport unit. The holding tank may be filled from visiting "nurse" tanker trucks, for example. Other possibilities exist so long as water may be continuously supplied to the nozzles of the spray arm. In any event, the high pressure water is preferably "provided by the vehicle," which term means from the vehicle/transport unit or from a trailer pulled by it.

In the preferred embodiment, water supplied to the spray-head is pressurized by a piston-pump driven by a powerful diesel engine. Depending on the number of nozzles mounted to the spray arm(s), the pump should be driven by a 150, 200, or 300 hp engine or more. Also, the high pressure pump should be able to deliver from about 25 to about 70 gallons per minute of water at up to 10,000 psi. The water reservoir high pressure pump and piping are preferably seated atop a trailer which is drawn behind the crane, backhoe or transport device. The tank(s), pumping systems and transport unit may comprise a single, integral unit, or the tank and/or pumping systems may be on a separate unit towed behind the transport unit on a trailer.

Figure 3A:
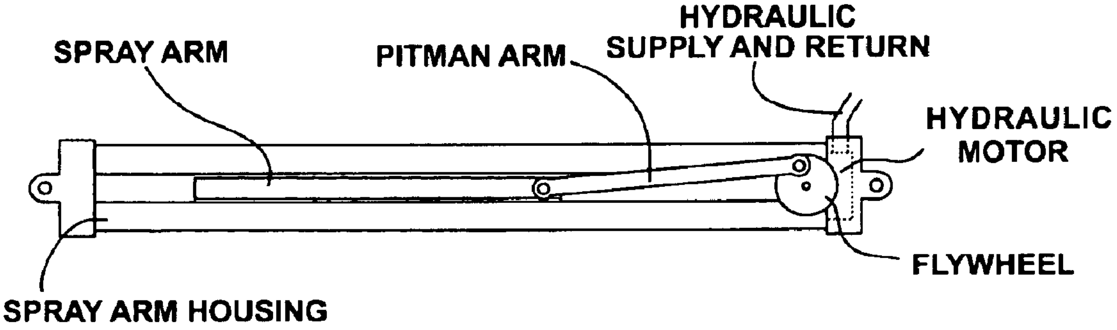
FIG. 3A is a top detail view of the preferred embodiment of the spray-head assembly of the present invention which facilitates horizontal displacement and reciprocating motion of the spray arm and corresponding nozzles.
Figure 3B:
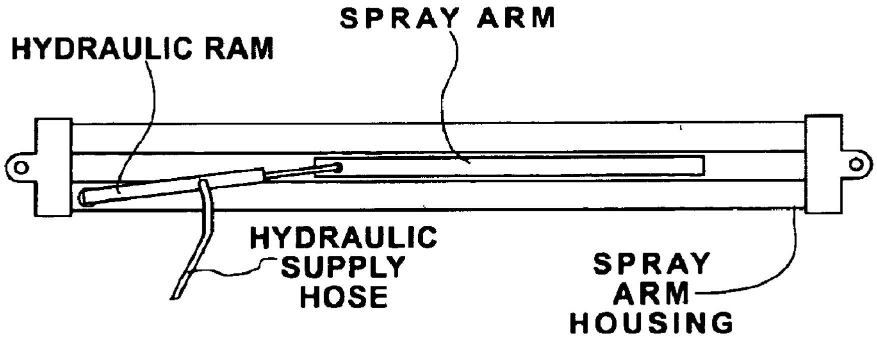
FIG. 3B is a top detail view of an alternative embodiment for a spray-head assembly of the present invention which also facilitates horizontal displacement and reciprocating motion of the spray arm and corresponding nozzles.
Figure 4A:
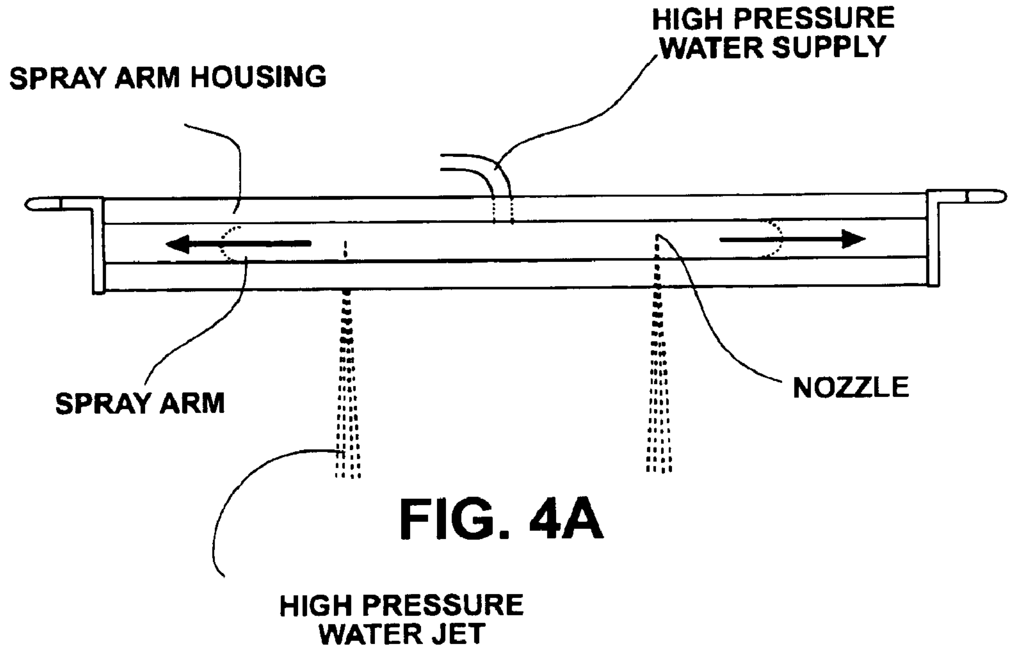
FIG. 4A is a side detail view of the spray-head assembly of FIG. 3A or 3B above, showing the nozzles and high pressure water jets.
Figure 4B:
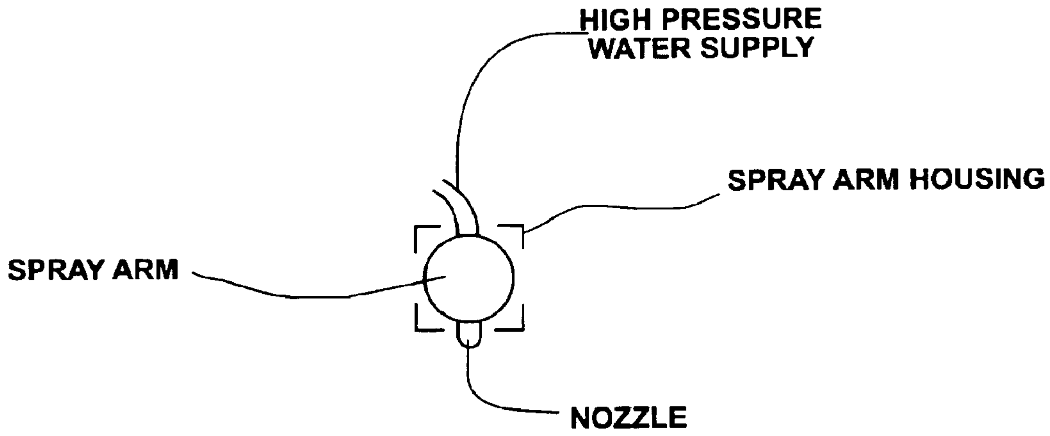
FIG. 4B is an end cross-sectional view of the spray-head assembly of FIG. 3A or 3B above showing a nozzle and high pressure water supply.

The high pressure water is piped from the pumping apparatus to the spray arm where each spray arm nozzle emits a thin stream of high pressure water capable of cutting, chopping and/or pulverizing plant matter in its path. Preferably, the spray arm is situated within a housing such that horizontal displacement of the spray nozzles is possible. In operation, the spray arms track back and forth continuously within the housing. Such horizontal displacement may be driven by a hydraulic ram, as shown in FIG. 3B. However, in the preferred embodiment, a hydraulic motor drives a flywheel which is mounted to the spray arm housing and operably connected to the spray arm via a pitman arm, as shown in FIG. 3A. As the flywheel turns, the pitman arm translates the rotary motion of the wheel into reciprocating, lateral displacement of the spray arm. The wheel is preferably about 18 inches in diameter to accommodate both sufficient horizontal displacement of the spray arm per rotation and rapid revolutions per minute. In another embodiment of the invention, an array of nozzles may be fixed in position on a spray arm. In this case, horizontal movement of the arm may not be necessary so long as there is sufficient overlap of the high pressure jet streams within the waterway. Also, pivotal action of the nozzles on the spray-head assembly may be provided.

A rigid turbidity plate is preferably mounted beneath the spray-head apparatus for movement in the waterway above the soil/sediment. This plate is preferably constructed of stainless steel or another material that is highly resistant to corrosion and wear. The plate, which may extend partially or completely across the waterway, minimizes or prevents disturbance of the soil/sedimentary layer by the streams of high pressure water which may be directed towards the bottom of the waterway. As the spray-head and the attached plate are advanced through the waterway, plant matter is cut, chopped and/or pulverized by the high velocity water jets. The spongy, flexible aquatic plants tend to fold over the turbidity plate as shown in FIG. 1. In the preferred embodiment, the spray nozzles of the spray arm, which may be rapidly displacing horizontally and perpendicular to the flow of the waterway, slice through the plant matter like a saw to clear a path within the waterway. Where the nozzles are directed vertically, a deeper, or shallower, path may be cut by adjusting the height of the turbidity plate above the soil layer of the waterway. If the nozzles of the spray arm are directed horizontally, as shown in FIG. 5, the spray-head assembly may be submerged to the desired depth. Clearing the waterway in this manner promotes fluid flow.

After the waterway is cleared, plant matter which has been cut and removed may be collected and processed for further applications. For example, the cut-up plant material may be strained from the waterway, and dried for use as an animal feed, with or without nutritional supplements. Also, the recovered plant material may be used for fertilizer, or as a construction material, or otherwise. A collection system may be integrated into the cutting apparatus, or a separate system may immediately trail the cutting apparatus, or follow the path at a later time, to collect any available aquatic plant material for reuse.

Although this invention has been described above with reference to particular means, materials and embodiments, it is to be understood that the invention is not limited to these disclosed particulars, but extends instead to all equivalents within the scope of the following claims.

What is claimed is:

1. An apparatus for removing plant matter from a waterway, the apparatus comprising:

a vehicle on land alongside the waterway;

a spray-head assembly attached to the vehicle and extending over or into the waterway, the spray-head assembly containing a nozzle and being adapted for reciprocating motion of the nozzle; and a water supply adapted to deliver water at high pressure from the vehicle to the nozzle of the spray-head so that water from the nozzle may cut plant matter in the waterway;

the apparatus further comprising a flywheel and a pitman linkage on the spray-head assembly, and said flywheel and pitman linkage provide said reciprocating motion of the nozzle.

2. An apparatus for removing plant matter from a waterway, the apparatus comprising:

a vehicle on land alongside the waterway;

a spray-head assembly attached to the vehicle and extending over or into the waterway, the spray-head assembly containing a nozzle and being adapted for reciprocating motion of the nozzle; and a water supply adapted to deliver water at high pressure from the vehicle to the nozzle of the spray-head so that water from the nozzle may cut plant matter in the waterway;

the apparatus further comprising a hydraulic ram on the spray-head assembly and said hydraulic ram provides said reciprocating motion of the nozzle.

* * * * *